US007620568B1

(12) United States Patent
Parker-Malchak

(10) Patent No.: US 7,620,568 B1
(45) Date of Patent: Nov. 17, 2009

(54) SELF-CHECKOUT SYSTEM

(75) Inventor: Leila Parker-Malchak, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 991 days.

(21) Appl. No.: 10/730,665

(22) Filed: Dec. 8, 2003

(51) Int. Cl.
*G06Q 20/00* (2006.01)
(52) U.S. Cl. .................. 705/23; 235/383; 235/462; 235/472; 235/494; 235/375; 235/385; 705/16; 705/17; 705/21; 705/22; 705/28; 705/29; 340/568; 340/572
(58) Field of Classification Search .................. 705/23
See application file for complete search history.

(56) References Cited

U.S. PATENT DOCUMENTS

| 5,640,002 A * | 6/1997 | Ruppert et al. ......... 235/462.46 |
| 2003/0185948 A1* | 10/2003 | Garwood .................. 426/392 |
| 2004/0195341 A1* | 10/2004 | Lapstun et al. ............. 235/494 |
| 2004/0199428 A1* | 10/2004 | Silverbrook et al. .......... 705/16 |

FOREIGN PATENT DOCUMENTS

EP    1248244 A2 *  10/2002

OTHER PUBLICATIONS

Merritt, Kerry. Can RFID effectively track inventory? Nov. 2001. Business & Industry, p. 1+.*

* cited by examiner

*Primary Examiner*—F. Zeender
*Assistant Examiner*—Fawaad Haider
(74) *Attorney, Agent, or Firm*—Harden E. Stevens, III

(57) ABSTRACT

A retail terminal and method of operation thereof. The retail terminal has a weight scale, a bar code scanner, RFID tag antenna, a scan error indicator, means for communicating with a processor and a memory containing a weight learning database (WLDB). The method comprises the steps of: allowing placement of an item, having an RFID tag, to be weighed on the weight scale; allowing scanning of the item via the bar code scanner; allowing RFID tag to be read by antenna located in the scanner; obtaining a weight measurement of the item on the scale upon successful scanning of the item; and comparing the measured weight of the scanned item with a predetermined weight for that item stored in the WLDB. Wherein the comparison detects a discrepancy between the measured and pre-determined weights for the item actuating the RFID antenna in order to detect the RFID tag on the scanned item; and wherein the item identified by the RFID tag matches the scanned item de-actuating the scan error indicator, which would otherwise have been actuated by the discrepancy between the stored and measured weights for the scanned item.

14 Claims, 2 Drawing Sheets

SELF-CHECKOUT SYSTEM

BACKGROUND

1. Field of the Invention

The present invention relates generally to checkout systems for retail businesses and, more particularly, to a checkout system having a scale for weighing objects for purchase.

2. Background Information

General merchandise stores and retail grocery, supermarket, or food stores utilize retail purchase transaction terminals or checkout systems such as assisted and non-assisted (self) checkout systems (collectively, checkout systems) to consummate the purchase transaction. These checkout systems generally include a scale for weighing produce and other items that are sold on the basis of weight. The scale measures weight of an item or multiple items for the checkout system to calculate a total price. An example of multiple items is a bunch of bananas or a bag of apples.

These checkout systems also typically include a scanner that is operative to read a bar code or uniform product code (UPC) that is on the item or at least one of the items. The bar code is used to identify the item(s) or contents of a bag of items. Once an item is scanned, the checkout system then knows to interrogate the scale to obtain a settled weight.

The central processor that controls the operation of the checkout system includes a weight learning database (WLDB), which stores a predetermined weight for each item stocked by the store. The weight measured by the scale is compared to the weight entered into WLDB and an error signal is triggered if there is a discrepancy between the two weights, for the scanned item.

However, this error signal can be triggered incorrectly, for example, when a hard wind blows against the security scale, when the items packaging has changed, or when the weight of the scanned item, as measured by the scale is correct and the weight listed in the WLDB is incorrect. This can happen for items such as liquid items if, for example, there has been some evaporation of liquid. Alternatively, the weight may simply have been entered into the WLDB incorrectly.

Also, some more serious security issue can arise when using self-checkout systems. For example, an unscrupulous user may weigh and scan a low cost item, say a 2 lb bag of flour, and bag a more expensive item, says a meat joint, of the same weight.

It would thus be advantageous to have a checkout system that ameliorates one or more of the above-noted shortcomings and/or problems in current checkout systems.

SUMMARY

In one form, the subject invention is a method of operating a retail terminal having a weight scale, means for identifying an item to be purchased, an RFID tag antenna focused on the bagging area of the terminal, a scan error indicator, means for communicating with a processor and a memory containing a weight learning database (WLDB), the method comprising the steps of:

allowing placement of an item, having an RFID tag, to be weighed on the weight scale;

allowing identification of the item to be purchased at the weight scale;

obtaining a weight measurement of the item on the scale upon successful identification of the item;

comparing the measured weight of the identified item with a predetermined weight for that item stored in the WLDB;

wherein the comparison detects a discrepancy between the measured and pre-determined weights for the item actuating the RFID antenna in order to detect the RFID tag on the scanned item; and wherein the item identified by the RFID tag matches the scanned item de-actuating the scan error indicator which would otherwise have been actuated by the discrepancy between the stored and measured weights for the scanned item.

Preferably, the identification of an item to be purchased is achieved by the scanning of the item utilizing a bar code scanner. Alternatively, the identification of an item to be purchased is achieved utilizing a second RFID antenna focused on the weight scale area of the terminal.

Preferably, the predetermined weight for the scanned item stored in the WLDB is up-dated based on the weight obtained from the weight scale.

Preferably, the scan error indication includes providing one of an audio indication and a visual indication.

In accordance with another aspect of the subject invention there is provided a retail terminal comprising:

a processor;

memory in communication with said processor and containing program instructions operative to control said processor, said memory further storing a weight learning database (WLDB) containing a list of predetermined weights for the item on sale;

a scale in communication with said processor;

a means for identifying an item to be purchased, at the weight scale;

a scan error indicator in communication with the processor; and an RFID tag antenna in communication with the processor, and focussed on the bagging area of the terminal;

said scale being operative to obtain a weight measurement of items placed on said scale;

the processor being arranged to compare the stored and measured weights for the identified item and to actuate the RFID antenna if there is a perceived error in the weight of the item as measured by the scale, the processor being further arranged to compare the item identified by the means for identifying an item to be purchased and by the RFID antenna, the scan error indicator only being actuated if the comparison of the items identified raises a discrepancy.

Preferably, the means for identifying an item to be purchased is a bar code scanner in communication with said processor. Alternatively, the means for identifying an item to be purchased is a second RFID antenna, focused on the scale area of the terminal and in communication with said processor.

Preferably, the indicator comprises one of an audio device and a video device.

Preferably, the first, or bag well, RFID tag antenna is attenuated so as not to detect tags located over the bar scale area of the terminal.

In accordance with yet another aspect of the present invention there is provided a checkout system comprising:

a processor;

a scale in communication with said processor and operative to obtain weight measurement of items placed on said scale;

a means for identifying items to be purchased, at the scale, and in communication with said processor; and memory in communication with said processor and containing program instructions operative to control said processor, said memory further storing a weight learning database (WLDB) containing a list of predetermined weights for the item on sale;

said scale being operative to obtain a weight measurement of items placed on said scale;

the processor being arranged to compare the stored and measured weights for the scanned item and to actuate the RFID antenna if there is a perceived error in the weight of the item as measured by the scale, the processor being further arranged to compare the item identified by the means for identification and the RFID antenna, the scan error indicator only being actuated if the comparison of the items identified raises a discrepancy.

BRIEF DESCRIPTION OF THE DRAWINGS

Corresponding reference characters indicate corresponding parts throughout the several views.

DETAILED DESCRIPTION OF THE INVENTION

Before discussing the method of the present invention in detail, we will review a retail terminal 10 in accordance with the present invention.

Figure 1:
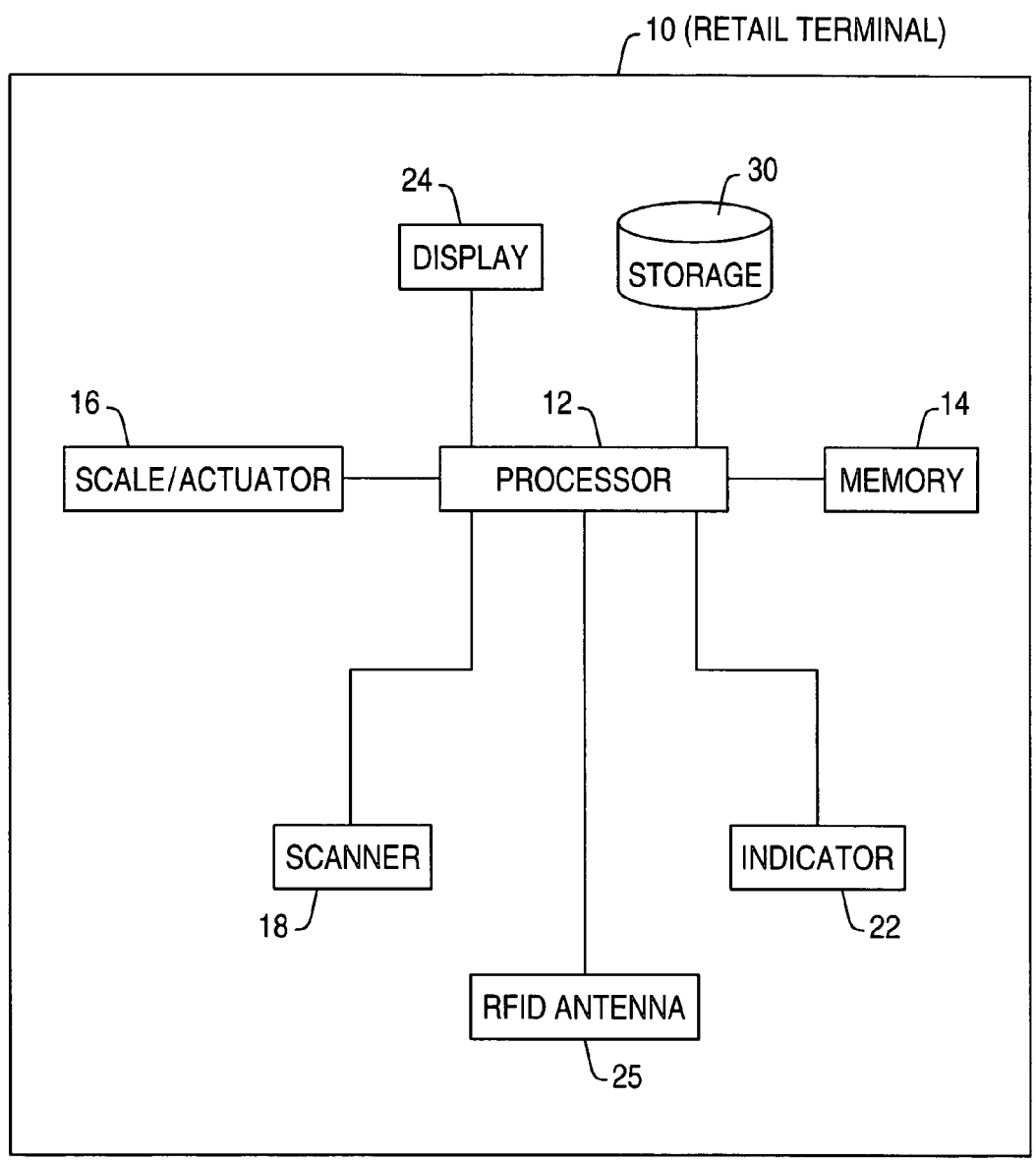
FIG. 1 is a block diagram of an embodiment of an exemplary retail terminal embodying the subject invention.

Referring to FIG. 1, there is depicted a block diagram of an exemplary retail terminal, generally designated 10. The retail terminal 10 is representative of any type of retail terminal such as a kiosk, a point-of-service (POS) terminal, an assisted checkout system/terminal, a self-checkout system/terminal, or the like (collectively, retail terminal).

The retail terminal 10 includes a processor, processing unit, processing circuitry/logic or the like (collectively, processor) 12, memory 14, a scale/actuator 16, a scanner 18, an indicator 22, a display 24, RFID antenna 25 and storage 30 (collectively, retail terminal components). It should be appreciated that while the retail terminal components are shown in FIG. 1 as "within" the retail terminal 10, some of the retail terminal components may be physically located at a distance to a retail terminal structure. Thus the block diagram of the retail terminal 10 represents those retail terminal components associated with the operation of a retail terminal in accordance with the principles of the subject invention. For example, the storage 30 may be located in a system server to which the retail terminal 10 is in communication. This would allow a plurality of retail terminals to utilize the storage 30 as well as provide a common storage for databases, look-up tables, and the like. If any such retail terminal component is physically remote from the retail terminal 10, it is inherent that the retail terminal 10 and the component are in communication via a network (wireless or wired) or any other type of communication medium.

The memory 14 of the retail terminal 10 may be any type of memory such as, without being exhaustive, RAM, ROM, EEPROM, DRAM, SDRAM, or the like, that is operative to either permanently or temporarily store program instructions (software) for the operation of the retail terminal 10 and/or the various retail terminal components. The memory 14 is in communication with the processor 12 such that the processor may execute the program instructions stored therein for operation of the retail terminal 10 in the manner set forth herein.

The memory further contains a Weight Learning Database (WLDB) 141 containing a predetermined weight for each of the items to be weighed by the scale 16.

The scale/actuator 16 is in communication with the processor 12 and is operative, in one mode, to obtain weight of an item or items placed thereon. In the weight-obtaining mode, the scale/actuator 16 is operative to obtain weight once, periodically, or continuously. In a single weight-obtaining mode, the scale measures weight and provides the obtained weight measurement to the processor 12. In a periodic weight-obtaining mode, the scale/actuator 16 is operative to obtain weight a given number of times (sampled) during a given period of time and provide the obtained measurements to the processor 12. The given number of times that the scale/actuator 16 samples weight is adjustable as well as the given period of time in which the scale/actuator 16 obtains the weight. In a continuous weight-obtaining mode, the scale/actuator 16 is operative to continuously measure weight and supply the measurements to the processor 12. When the scale/actuator 16 receives the trigger signal, the weight as measured by the scale/actuator 16 is utilized as the stable or settled weight for price calculation of the items on the scale/actuator 16.

The scanner 18 is in communication with the processor 12 and is operative to read machine-readable indicia on an item. The machine-readable indicia may be a bar code such as a UPC (Uniform Product Code), or the like. The scanner is further operative to provide data regarding the machine-readable indicia on the item to the processor 12. The scanner 18 is preferably a continuous read type scanner that is operative to read machine-readable indicia on a continuous basis. The scanner 16 provides scan data to the processor 12 after a valid reading of the bar code. The processor 12, in communication with the storage 30, accesses product databases and look-up tables therein, to ascertain whether a weight must necessarily be obtained for the items, price or pricing information, product information and the like (collectively, product data).

The processor 12 is operative to receive weight measurement(s) from the scale/actuator 16, the bar code data from the scanner 18, product data from the storage 30, program instructions from the memory 14. The processor 12 is further operative to provide an indicator signal to the indicator 22. The indicator signal allows the indicator 22 to provide an audio and/or visual indication to a user of the retail terminal 10 that there has been successful scaling (i.e. that a successful settled or stable weight has been obtained). Successful scaling will be described in greater detail below. The indicator 22 may be a light, a sound, or a combination of light and sound. The indicator 22 may be a stand-alone device or may be incorporated into another device such as the display 24.

The scale/actuator 16 is operative to wait a specified time to obtain a weight data/measurement from the scale/actuator 16 regarding an item or items placed thereon rather than at the moment (or very near the moment) that a weight is stable or placed thereon. Particularly, the scale/actuator 16 is operative to wait until either a trigger or actuation signal is received or a predetermined time length or duration has elapsed (a timer) after the items have been placed on the scale/actuator 16 to obtain a stable weight measurement. The stable weight measurement is then sent to the processor 10 to be processed according to the product data from the storage 30 and the program instructions. An indication is then made via the indicator 22 when a stable weight measurement is successfully processed.

The trigger or actuator providing a trigger or actuation signal in the embodiment of FIG. 1 is integral with the scale 16.

Figure 2:
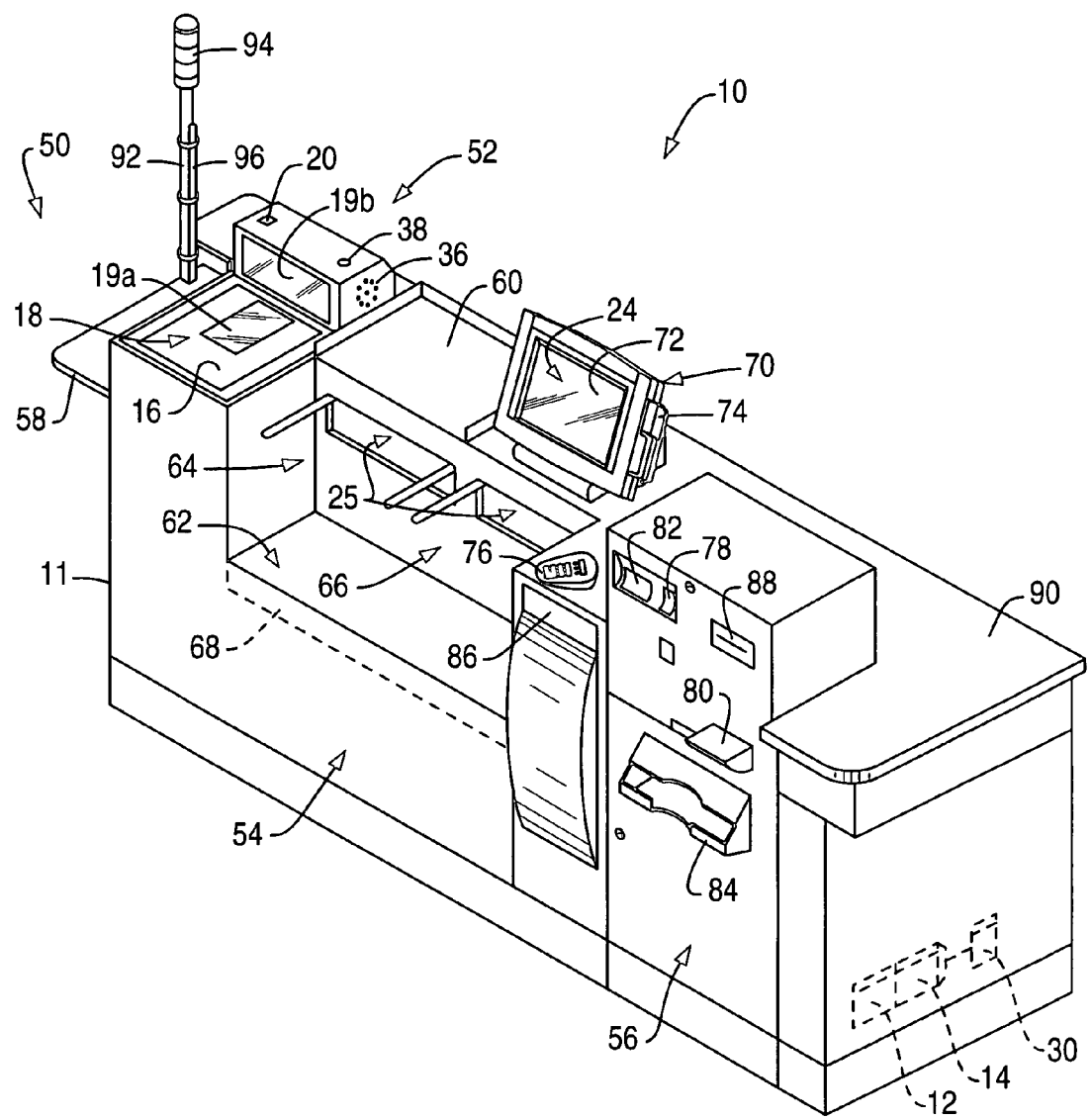
FIG. 2 is a perspective view of an exemplary retail terminal embodied as a self-checkout embodying the subject invention.

Referring to FIG. 2, there is depicted a retail terminal (such as a self-service checkout or self checkout system) generally designated 10 representing the retail terminal 10 previously discussed in which the subject invention may be utilized. The retail terminal 10 includes housing 11. Typically the retail terminal 10 is within a retail store such as a grocery store.

The retail terminal 10 is configured to perform a number of retail functions such as unassisted or "self-service" checkout functions. What is meant herein by the term "self-service checkout functions" or "self-service checkout transaction" or "self-service purchase transaction" are those checkout functions or transactions that are performed by a checkout system by the customer himself or herself without the assistance of a clerk or other personnel employed by the retailer. For example, a self-service checkout (purchase) function or transaction would be performed on the retail terminal 10 in response to a customer himself or herself scanning or otherwise entering items for purchase into the checkout system, and thereafter depressing a payment key on the checkout system that indicates the manner by which the customer intends to pay for such items (e.g. by interaction with a credit/debit card reader or currency acceptor). Accordingly, what is meant herein by the phrase "self-service mode of operation" is a configuration of the retail terminal 10 that allows the system 10 to perform a self-service checkout (purchase) function or transaction.

In addition, what is meant herein by the term "customer" or "consumer" (in the context of the subject invention) is a person who enters a retailer's store, selects his or her items for purchase from the shopping area of the store, checks out his or her items for purchase at a checkout system such as the retail terminal 10 (including tendering payment for his or her items for purchase), and then exits the store subsequent to tendering payment. Hence, as used herein, a customer or consumer is distinguished from retail personnel such as a checkout clerk or other employee of the retailer in that a customer or consumer enters the place of business for the purpose of purchase items from the store. Moreover, what is meant herein by the term "retail personnel" is a person that is employed by the retailer to perform a retail activity such as assistance in operation or other function of the retail terminal 10. Also, the term "user" is herein used to refer to any operator of the retail terminal 10. Accordingly, a user may be retail personnel, a customer or consumer, or any other person who operates the retail terminal 10.

The retail terminal 10 includes a housing 11 that defines a pre-scan area 50, an itemization area 52, a bagging area 54, and a payment area 56. The pre-scan area 50 includes a shelf 58 on which a customer may place a shopping basket (not shown) or items for eventual scanning. In particular, the pre-scan area 20 provides a place where the customer can place items for purchase before scanning. It should be appreciated that the shelf 58 is only representative of a pre-scan area wherein a customer may place items for purchase.

The itemization area 52 of the retail terminal 10 includes the scanner 18 and the produce scale 16. The scanner 18 conventionally scans or reads a product identification code such as a Universal Product Code (UPC), industrial symbol (s), alphanumeric character(s), or other indicia associated with an item to be purchased. One scanner that may be used in the subject invention is a model number 7875 bi-optic scanner that is commercially available from NCR Corporation of Dayton, Ohio.

The scanner 18 includes a first scanning window 19*a* and a second scanning window 19*b*. The first scanning window 19*a* is disposed in a substantially horizontal manner, whereas the second scanning window 19*b* is disposed in a substantially vertical manner. The horizontal or first scanning window 19*a* is disposed in a relatively flush-mount arrangement with the produce scale 16 such that the produce scale 16 is integrated with the scanner 18. If an item such as produce is placed upon the produce scale 18 or the first scanning window 19*a*, the produce scale 18 may be used to determine the weight of the produce (item).

The scanner 18 includes a light source (not shown) such as a laser, a rotating mirror (not shown) driven by a motor (not shown), and a mirror array (not shown) such as is conventional in the art. In operation, a laser beam from the laser reflects off the rotating mirror and mirror array to produce a pattern of scanning light beams. As the product identification code on an item is passed over in front of the scanner 18, the scanning light beams scatter off the product identification code and are returned to the scanner 18 where they are collected and detected. The reflected light is then analyzed electronically in order to determine whether the reflected light contains a valid code pattern. If a valid code pattern is detected or present, the product identification code may then be utilized to retrieve product information associated with the item (e.g. the price of the item, product description, or the like). This information or code data is forwarded to the processor 12. The scanner 18 (or the scanner housing) also includes an activator 20 (in the case the produce scale is not an integral scale/actuator), the speaker 36 for providing sound, and the light 38 as the indicator 22. The scale 16 is operative in the manner set forth above. The itemization area 52 also includes a post-scanning or set-aside area or shelf 60 on which a customer may place items before being bagged as described below in conjunction with the bagging area 54.

The bagging area 54 includes a bagwell 62 that is of sufficient size to accommodate a first bag holder/bagging area 64 and a second bag holder/bagging area 66. The first and second bag holder/bagging areas 64 and 66 each are adapted to retain a plurality of paper and/or plastic bags (not shown) for holding scanned items to be purchased. The bagwell 62 is configured such that a bag and its contents (items scanned for purchase) rest upon a security scale 68. The security scale 68 is a weight scale that monitors the weight of items placed into a bag located in the bagwell 62. Such monitoring during a checkout transaction is particularly useful to prevent improprieties during the checkout transaction.

Particularly, the security scale 68 is utilized to monitor the ingress and egress of items into and out of the bagging area 54. More particularly, the security scale 68 is utilized to detect placement of items into and out of the bag wells 64 and 66. Such item movement monitoring may be utilized to determine if the customer is unintentionally or intentionally committing an impropriety such as theft. For example, a control signal is generated when the scanner 18 successfully captures a product code associated with an item being entered into the retail terminal 10. The security scale 68 may be used to detect placement of an item into the bagging area 54 without being scanned by the scanner 18 in the itemization area 52. Moreover, when an item is scanned with the scanner 18 and thereafter placed into a bag in the bagwell 64 or 66, the detected weight of the item (as detected by the security scale 68) may be compared to a known weight value of the item that is stored in a database (WLDB) in the storage 30 in order to confirm that a different, potentially more expensive item was not substituted for the scanned item or the settled or stable weight obtained by the produce scale 16 in the manner of the principles of the subject invention. It should be appreciated that the database may be in the form of a master database that includes every item sold by the retailer, or may be a "transaction level" database that is constructed locally at the retail terminal 10 during operation thereof.

The retail terminal 10 also includes a user interface terminal 70 for receiving input from and providing information to a customer. In particular, the retail terminal 10 includes an interactive customer interface terminal 70. The interactive customer interface terminal 70 includes a display monitor 24 that is provided to display retail information to the customer during operation of the retail terminal 10. For example, transaction information such as item price, item description, total amount of the transaction, instructions, weight on the scale 16, etc. is displayed to the customer via the display monitor 24 during operation of the retail terminal 10. Moreover, instructions may be displayed on the display monitor 24 that assist or otherwise guide the customer through operation of the retail terminal 10.

Additionally, customer-specific messages may be displayed to the customer on the display monitor 24 at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement that advertises a product that was purchased by the customer during a previous visit to the retailer's store. The retail terminal 10 is configured to retrieve information from a customer profile database that contains information about each of the retailer's customers. Moreover, a customer-specific message may include a customer-specific advertisement that advertises a product that may be used in conjunction with a product that was previously scanned or otherwise entered into the retail terminal 10 during the current checkout transaction. As well, the customer-specific message may indicate that the customer needs to deactivate a detected EAS tag.

The display monitor 24 of the interactive customer interface terminal 70 preferably incorporates a known touch screen monitor 72 that can generate data signals when certain areas of the screen are touched by a customer. Hence, the display monitor 24 may be utilized by the customer to input information into the retail terminal 10. For example, the customer may manually enter retail information such as item codes and quantities into the retail terminal 10 by use of the touch screen 72 associated with the display monitor 24. The customer may indicate his or her preferred method of payment (e.g. cash, credit card, or debit card) by touching the appropriate area of the touch screen 72 associated with the display monitor 24. A portion of the touch screen 72 associated with the display monitor 24 may also be used as a signature capture area wherein a stylus 74 is used to input a customer's signature in the case of a credit card purchase or other type purchase requiring a signature.

The payment area 56 of the retail terminal 10 includes the system components necessary to allow a customer to perform retail finalization functions such as tendering payment for his or her items for purchase and printing of purchase transaction receipts. In particular, the payment area 56 of the retail terminal 10 includes an electronic payment terminal 76 having a card reader and keypad, a pair of currency acceptors such as a coin acceptor 78 and a bill acceptor 80, a corresponding pair of currency dispensers such as a coin dispenser 82 and a bill dispenser 84, and a receipt printer 86. As shown in FIG. 1, the system components associated with the payment area 56 are positioned to face the customer.

The system components associated with the payment area 56 of the retail terminal 10 are provided to allow the customer to tender payment for his or her items for purchase. In particular, once the customer has entered all of his or her items for purchase into the checkout terminal 10 during a self-service checkout/purchase transaction, the components associated with the payment area 56 are utilized to complete the self-service checkout/purchase transaction by (1) allowing payment to be tendered by either insertion of currency into a currency acceptor (i.e. the coin acceptor 78 and/or the bill acceptor 80), charging a credit card or debit card account, or decreasing a value amount stored on a smart card, cash card, or gift certificate card via the electronic payment terminal 76, and (2) printing a purchase transaction receipt with the receipt printer 86. In the case of when a customer inserts currency into the coin acceptor 78 and/or the bill acceptor 80, the retail terminal 10 may provide change via the coin dispenser 82 and/or the bill dispenser 84. The payment area 56 also includes a coupon acceptor 88 that is adapted to receive coupons. The coupon acceptor 88 is operative to read indicia on a coupon to determine if the coupon has expired, the amount, and to correlate whether an item corresponding to the coupon has been scanned for purchase. At the end of the payment area is a set-aside shelf 90. The set-aside shelf 90 may be used for various purposes such as putting aside bread before placing the same into a bag until the bag is essentially full with heavy items.

The retail terminal 10 also includes an accessory pole 92 that supports a status light device 94, and an antenna/paging device 96. The accessory pole 92 may also support a camera (not shown). The status light device 94 and the antenna/paging device 96 are provided in order to notify store personnel, such as a customer service manager, if intervention into the current checkout transaction is needed. In particular, if during operation of the retail terminal 10, an intervention-needed activity is detected, the status light device 94 and/or the antenna/paging device 96 are operated so as to summon retail personnel, such as the customer service manager. What is meant herein by the term "intervention-needed activity" is (1) activity by the customer or retail personnel in which the retail terminal 10 is unintentionally operated improperly, (2) activity by the customer or retail personnel in which it can be inferred with a high degree of confidence that the retail terminal 10 is intentionally operated improperly for illicit purposes such as theft, (3) activity by the customer or retail personnel in which the customer or retail personnel operates an input device associated with the retail terminal 10 in a manner that indicates the he or she is in need of assistance, and (4) activity by the components associated with the retail terminal 10 that has rendered the system in need of maintenance or other type of service.

An intervention-needed activity may take the form of a security-breach activity in which the retail terminal 10 is being operated in a manner that is placing the retailer in a position of potential financial loss due to goods being taken from the store without having first been paid for (either intentionally or unintentionally), less than all the goods being weighed in the case of produce that results in a false total price for the produce, or a non-security-breach activity in which the customer is in need of assistance or the retail terminal 10 is in need of maintenance, but wherein the retailer is not at risk of financial loss due to goods being taken from the store without having been paid for first. The retail terminal 10 may also have a video monitoring system (not shown).

The RFID antenna 25 is located adjacent the bagging area 54, either at the take away belt (not shown in this embodiment) or the bag well 64. In this way the antenna 25 can detect and identify the specific items, which have been scanned by the user and placed in their bag or on the take away belt to be bagged. In addition if a different item, of the same or very similar weight, is placed in the bag or on the take away belt after scanning a lower cost item then the non-scanned item is the one which is detected and identified by the antenna 25. This makes it impossible for customers to swap higher priced, un-scanned items for lower priced, scanned items. A second RFID antenna (not shown) can be located adjacent the scanner 18 to further identify items as they are scanned although this is not an essential element of the present invention. This is useful to the present invention because each item's unique RFID would be detected as it is scanned for a comparison to be made to the RFID of the item being placed in the bag well 64 or the take away belt (not shown).

Operation

A user scans an item, by swiping the item past the window 19a or 19b of the scanner 18, as normal. If the item is also to be weighed the user places the item to be weighed on the scale 16, as normal. Once scanned and weighed the user places the item in a bag in the bag well 64.

In prior art retail terminals if the weight of the item as determined by the scale 16 differs from the weight for that item stored in the weight learning database (WLDB) 141 in the memory 14, then the processor 12 would automatically actuate an error indicator 22, which would draw this discrepancy to the attention of the customer and the retail store staff.

However, in the retail terminal 10, in accordance with the present invention, if such a weight discrepancy is detected the process 12 will instead access the RFID information from the RFID antenna 25. The antenna 25, which is focused at the bagging area 54 will detect the scanned item and identify the item, as for example, a bottle of detergent. If the bar code detected by the scanner 18 also identified the item as a single bottle of detergent then the processor will abort the error signal indication. It can also then update the WLDB 141 to the newly detected weight for the item.

If, on the other hand, the items identified by the antenna 25 and the scanner 18 are not the same then the process 12 will actuate the error indicator 22, as normal.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A retail terminal comprising:
a processor;
a memory in communication with said processor and containing program instructions operative to control said processor, said memory further storing a weight learning database (WLDB) containing a list of predetermined weights for items for sale;
a scale in communication with said processor and operative to obtain a weight measurement of an item for sale placed on said scale;
a means for determining the identification of the item, at the weight scale;
a scan error indicator in communication with the processor; and
a first radio frequency identification (RFID) tag antenna in communication with the processor, and focused on a bagging area of the terminal;
the program instructions operative to control said processor to compare the stored and measured weights for the identified item and to actuate the first RFID antenna to verify the identification of the item if there is a perceived error in the weight of the item as measured by the scale,
the program instructions further operative to control said processor to compare the item identification determined by the means for determining the identification of the item and by the first RFID antenna,
the scan error indicator only being actuated if the comparison of the identification of the item raises a discrepancy.

2. A retail terminal as claimed in claim 1, wherein the means for determining the identification of the item comprises a bar code scanner in communication with said processor.

3. The retail terminal of claim 1, wherein the means for determining the identification of the item comprises a second RFID antenna, focused on the scale area of the terminal and in communication with said processor.

4. The retail terminal of claim 1, wherein said indicator comprises one of an audio device and a video device.

5. The retail terminal of claim 1, wherein the first RFID tag antenna is attenuated so as not to detect tags located at the scale.

6. A checkout system comprising:
a processor;
a scale in communication with said processor and operative to obtain a weight measurement of an item placed on said scale;
a means for identifying the item, at the scale, and in communication with said processor; and
memory in communication with said processor and containing program instructions operative to control said processor, said memory further storing a weight learning database (WLDB) containing a list of predetermined weights for items for sale;
the program instructions operative to control said processor to compare the stored and measured weights for the identified item and to actuate a first radio frequency identification (RFID) antenna if there is a perceived error in the weight of the item as measured by the scale,
the program instructions further operative to control said processor to compare the identification of the item identified by the means for identification and the RFID antenna,
the scan error indicator only being actuated if the comparison of the identification of the item raises a discrepancy.

7. The checkout system of claim 6, wherein said indicator comprises one of an audio device and a video device.

8. A retail terminal as claimed in claim 6, wherein the means for identifying an item to be purchased is a bar code scanner in communication with said processor.

9. The retail terminal of claim 6, wherein the means for identifying an item to be purchased is a second RFID antenna, focused on the scale area of the terminal and in communication with said processor.

10. A retail terminal comprising:
a scale for generating scale data;
a processor for executing program instructions and operably connected the scale and to a weight learning database (WLDB) containing a list of predetermined items and associated weights for the items; and
a memory in communication with the processor and containing program instructions for controlling the processor to:
obtain scale data for an item placed on the scale,
identify the item placed on the scale as one of the items in the list of items;

obtain the associated weight for the one of the items in the list of items, actuate a first radio frequency identification (RFID) antenna to obtain RFID data from the item that was placed on the scale in response to identification of a discrepancy between the obtained scale data and the obtained associated weight, compare the identity of the item placed on the scale with an identification based upon the RFID data, and generate an indication if the RFID data identification does not match the identity of the item placed on the scale.

11. The retail terminal of claim 10, further comprising:

a scanner operably connected to the processor, wherein the program instructions for controlling the processor to identify the item placed on the scale further comprise program instructions for controlling the processor to identify the item placed on the scale using scanner data generated by the scanner.

12. The retail terminal of claim 10, further comprising:

a second RFID antenna operably connected to the processor, wherein the program instructions for controlling the processor to identify the item placed on the scale further comprise program instructions for controlling the processor to identify the item placed on the scale using RFID data generated by the second RFID antenna.

13. The retail terminal of claim 10, further comprising:

a bag well area, wherein the first RFID antenna is focused on the bag well area.

14. The retail terminal of claim 10, further comprising:

a scan error indicator in communication with the processor for indicating when the RFID data identification does not match the identity of the item placed on the scale.

* * * * *